United States Patent [19]
Ellis

[11] 3,959,543
[45] May 25, 1976

[54] NON-LINEAR RESISTANCE SURGE ARRESTER DISC COLLAR AND GLASS COMPOSITION THEREOF

[75] Inventor: Howard F. Ellis, Stephentown, N.Y.

[73] Assignee: General Electric Company

[22] Filed: May 6, 1974

[21] Appl. No.: 467,442

Related U.S. Application Data
[62] Division of Ser. No. 361,250, May 17, 1973.

[52] U.S. Cl. ............................ 428/66; 428/209; 428/210; 428/432; 106/53; 252/518
[51] Int. Cl.² .................. B32B 3/02; B32B 15/00
[58] Field of Search ............ 252/518; 117/212, 217, 117/201; 106/53; 428/66, 209, 210, 432, 539; 338/308

[56] References Cited
UNITED STATES PATENTS

| | | | |
|---|---|---|---|
| 2,529,144 | 11/1950 | Evans et al. ...................... | 252/516 |
| 3,437,892 | 4/1969 | Hoffman ............................... | 106/53 |
| 3,586,913 | 6/1971 | Olsen ..................................... | 317/72 |
| 3,671,800 | 6/1972 | Stetson ................................. | 315/36 |
| 3,681,261 | 8/1972 | Mason ............................ | 252/518 X |
| 3,700,606 | 10/1972 | Parks ................................ | 106/53 X |

*Primary Examiner*—Michael F. Esposito
*Attorney, Agent, or Firm*—Volker R. Ulbrich

[57] ABSTRACT

A zinc oxide compound non-linear resistance surge arrester disc is provided with a glass anti-flashover collar having a relatively low fusing temperature and a relatively low coefficient of thermal expansion. The glass comprises the following constituents in proportion to one-another by weight:
about 44.5% lead oxide,
about 24.5% zinc oxide,
about 20.5% boric oxide,
about 4.5% silicon oxide, and
about 6.0% cupric oxide.

2 Claims, 2 Drawing Figures

NON-LINEAR RESISTANCE SURGE ARRESTER DISC COLLAR AND GLASS COMPOSITION THEREOF

CROSS-REFERENCE TO RELATED APPLICATIONS

The present application is a divisional application of co-pending application Ser. No. 361,250 filed 17 May, 1973.

BACKGROUND OF THE INVENTION

The invention relates generally to non-linear resistance elements and particularly to those used in devices for overvoltage protection in an electrical system.

Materials which have a distinctly non-linear current-voltage characteristic are commonly used in protective devices. One such protective device, for example, is an overvoltage, or surge arrester, used to protect electrical equipment against insulation damage resulting from voltage surges which exceed the normal operating voltage of the equipment. Surge arresters and their function are described to some extent in the following:

U.S. Patent Nos.
3,671,800 issued 20 Jun. 1972 to E. W. Stetson;
3,586,913 issued 22 Jun. 1971 to A. A. Olsen et al;
2,529,144 issued 7 Nov. 1950 to E. A. Evans et al.

Technical Publications

*Electrical Transmission and Distribution Reference Book*, Fourth Ed., Westinghouse Electric Corp, Pittsburgh, Pennsylvania, 1950 pp 621–627. Ichinose, Noboru "High-Performance Ceramic Varistor Element," in *Japan Electronic Engineering*, July 1972 pp 32–36.

Typically, an arrester includes a valve section and a gap section in series inside a cylindrical insulating housing. The valve section is made up of one or more disc-shaped non-linear resistance elements stacked face-to-face. The primary function of the valve section is to sufficiently reduce the magnitude of the follow-current after a discharge to permit interruption of the current by the gap section. The number and the dimensions of the resistance discs in a given arrester are determined by the protection requirements and manufacturing considerations.

Each of the resistance discs of an arrester is generally provided with an insulating collar about the periphery. The collar prevents flash-over between successive discs during a discharge of the arrester. In the manufacture of relatively porous fired silicon carbide discs which are widely used for arresters, a ceramic collar is formed by applying a water-based ceramic particle slurry to the peripheral surface of the silicon carbide material prior to firing. During the subsequent firing process, the glass particles in the slurry fuse together to form a tightly adherent insulating collar. For less porous discs a glass collar may be applied from a glass particle slurry in much the same way.

Certain zinc oxide compounds are superior to silicon carbide as the resistance disc material in that they have an even greater non-linear current-voltage characteristic. The zinc oxide compounds may be formed into resistance discs by pressing and sintering in much the same way as are silicon carbide discs. However, several problems are encountered in the application of a collar to zinc oxide discs. First, the nature of the pressed zinc oxide material is such that a water-based slurry does not sufficiently wet the surface prior to the sintering; therefore, the slurry must be applied after sintering and a separate heating cycle added to the manufacturing process to fuse the slurry particles together. Second, presently used slurries which fuse during the sintering process require a firing temperature of at least 800°C (Celsius), so high that the characteristics of sintered zinc oxide discs are likely to be degraded by the addition of such a separate slurry firing step to the manufacturing. Thirdly, while certain common lead oxide glass slurries have a fusing temperature low enough to permit firing of the zinc oxide at that temperature to form a glass collar without significant degradation of the zinc oxide disc, the coefficient of thermal expansion of such glasses is so high relative to that of the zinc oxide compound that upon cooling of the disc the fused collar material fractures, rendering the collar defective.

SUMMARY OF THE INVENTION

In the present invention a non-linear resistance disc is provided with a collar of a novel glass composition having a relatively low coefficient of expansion, while also having a relatively low fusing temperature.

PREFERRED EMBODIMENT OF THE INVENTION

Figure 1:
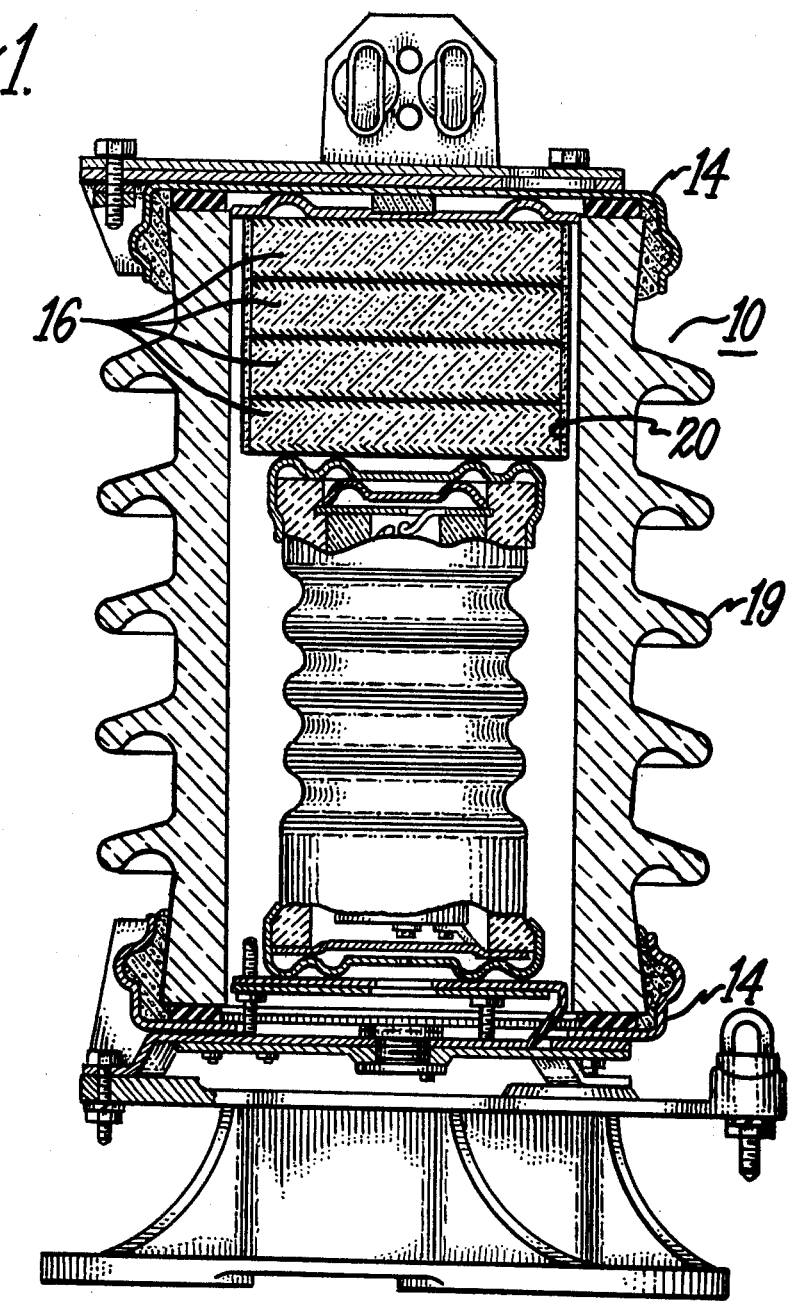
FIG. 1 is a sectional view of a lightning arrester provided with non-linear resistance discs in accordance with a preferred embodiment of the invention. The discs are provided with the novel glass collar.

One embodiment of the invention is shown in the station surge arrester 10 in FIG. 1 of the drawing. The arrester 10 includes a porcelain cylinder housing 12 having two metal end caps 14. Inside the porcelain cylinder 12 are a number of disc-shaped resistance elements 16 stacked face-to-face.

Figure 2:
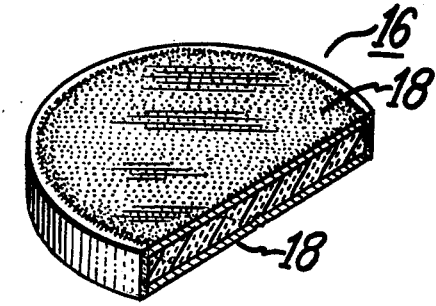
FIG. 2 is a partly sectional view of one of the varistor discs of the arrester of FIG. 1.

One of the resistance disc elements 16 is shown in greater detail in FIG. 2. The disc is of sintered zinc oxide compound containing as impurities, 0.5 mole percent bismuth oxide ($Bi_2O_3$),
0.5 mole percent cobalt oxide ($Co_2O_3$),
0.5 mole percent manganese oxide ($MnO_2$),
1.0 mole percent antinomy oxide ($Sb_2O_3$),
0.5 mole percent stannic oxide ($SnO_2$),
0.1 mole percent barium carbonate ($BaCO_3$), and
0.1 mole percent boron oxide ($B_2O_3$).

The disc 16 is about 2.8 inches in diameter and about 0.9 of an inch thick. Both faces are covered with a coating 18 of silver about 2 to 3 mils thick.

About the outside perimeter of the disc is a glass anti-flashover collar 20 about 3 to 5 mils thick. The glass of the collar 20 has a composition by weight of about;

44½% lead oxide (PbO),
24½% zinc oxide (ZnO),
20½% boron oxide ($B_2O_3$),
4½% silicon dioxide ($SiO_2$), and
6% cupric oxide (CuO), The voltage rating for the individual discs 16 is about 3 kilovolts.

The process for making the resistance discs 16 is generally as follows: the zinc oxide composition in powdered form is pressed into a disc shape with the diameter of about 3.4 inches and a thickness of somewhat over 1 inch to form a blank. This blank is then sintered by firing in air at a temperature of about 1200°C for about 5 hours. Thereafter it is cooled at about 100°C per hour. Now, a slurry of finely divided glass particles, having the composition as described above and mixed with ball clay to hold the glass in suspension, is applied to the outside surface about the perimeter of the disc 16. The disc 16, with the applied slurry, is now fired again in air at a temperature of between 640° and 650°C for about 30 minutes to cause the glass particles in the slurry to fuse to one another and to the disc 16 form the collar 20. A silver paste previously applied to both faces of the disc 16 also fuses during this same heating step to form contact areas on the faces.

The coefficient of thermal expansion of the glass of the collar 20 is only in the order of $6.5 \times 10^{-6}$ to $7.0 \times 10^{-6}$. This is sufficiently close to the coefficient of thermal expansion of zinc oxide compound to prevent cracking of the collar 20 upon cooling of the disc 16. At the same time, the melting temperature of the collar glass is low enough that it may be fused from its slurry to a continuous coating at about 650°C, a low enough temperature to avoid significant degradation of the current-voltage characteristics of the already fired and sintered disc 16. Moreover, the collar 20 is relatively scratch resistant and smooth, both desirable characteristics for high voltage surge arrester applications.

General Considerations

The composition of the collar glass may vary somewhat from the composition given above in the description of the preferred embodiment, while still having the desirable properties of low melting point together with a relatively low coefficient of thermal expansion. For example, the glass may have from about 41% to about 48% by weight of lead oxide,
from about 22½% to about 26½% by weight of zinc oxide,
from about 18½% to about 22½% by weight of boric oxide,
from about 2½% to about 6½% by weight of silicon oxide, and
from about 4% to about 8% by weight of cupric oxide.

The particular percentage ratios may be chosen to suit the particular processing conditions which are suitable for the particular non-linear resistance material of the disc to which the collar is applied. The percentage ratios as given in the preferred embodiment above are particularly desirable for zinc oxide discs. Generally, a decrease in the percentage of lead oxide in the glass will result in a higher fusing temperature, which might damage the non-linear current-voltage characteristics of the material. On the other hand, an increase in lead oxide results in a higher coefficient of thermal expansion, thus increasing the risk of cracks upon cooling of the disc, especially a zinc oxide disc.

The composition of the novel glass collar differs from that of the generally known low temperature glasses in that it has a substantially lower percentage of lead oxide. Most lead oxide glasses for low fusing temperature applications have on the order of 60% or more lead oxide present, whereas the novel glass has substantially less than 50% lead oxide, while having considerably more zinc oxide and copper oxide present. Varying of the content of the lead oxide di-valent ion "modifier" in such glasses usually is accompanied by a corresponding increase in the content of "glass-formers," such as boric oxide and silicon oxide. In the novel collar glass, however, the decrease in the lead oxide content is accompanied instead by a corresponding increase in the content of the di-valent ion modifiers zinc oxide and copper oxide.

Commercially available low temperature glasses generally have a coefficient of thermal expansion on the order of at least 8 times $10^{-6}$. Commonly available lead glass, for instance, has a coefficient of thermal expansion on the order of about 9 to $10 \times 10^{-6}$. The novel collar glass coating has a coefficient of expansion of only about 7 times $10^{-6}$, very close to the coefficient of thermal expansion of zinc oxide, which is on the order of 6½ to $7 \times 10^{-6}$. The softening temperature of the glass is about 465°C.

While the preferred embodiment describes an anti-flash-over collar on a high voltage surge arrester, it is to be understood that the novel glass may be used also for insulating surface areas of zinc oxide in other applications, such as for smaller surge arresters which might be used, for instance, on watt-hour meters or in other lower voltage circuits. Zinc oxide non-linear resistance devices are also used in circuits of the consumer electronic type to protect semiconductor devices against damaging overvoltages. The novel glass may similarly be used as an insulating protective coating on such devices because of its thermal compatibility with zinc oxide.

It should be noted also that the novel glass may also be particularly useful for coating any other material for any of various purposes where the coefficient of expansion of the material to be coated is generally the same as that of the glass.

Certain relatively inert fillers may be added to the novel glass without significantly affecting the desirable properties with respect to the coefficient of thermal expansion and fusing temperature. For example, as much as 55% aluminum oxide may be added to the slurry prior to application to the zinc oxide. It is also useful to add 2% to 5% suspending clay or ball clay in order to hold the glass particles in suspension in the slurry. The addition of an aluminum oxide filler, however, results in a relatively rough matte finish, which is, for a number of reasons, not so desirable for anti-flashover collar applications, but may be desirable for other, lower voltage purposes. The composition percentages as given herein for the novel glass collar indicate the relative quantities of the constituents of the glass only, and do not include in the total any filler materials added to the slurry. By "filler" is meant any finely divided material which has a substantially higher melting temperature than the glass, and therefore does not fuse to itself at the fusing temperature of the slurry, but rather is bound by the fused glass, and which has a coefficient of thermal expansion on the same order as that of the glass.

I claim:

1. A non-linear resistance device of the type having a resistance element of predominantly zinc oxide and an insulating coating on a portion of the surface of said element, wherein the improvement comprises that said coating is a glass consisting essentially of:

from about 41% to about 48% by weight of lead oxide,
from about 22.5% to about 26.5% by weight of zinc oxide,
from about 18.5% to about 22.5% by weight of boric oxide, from about 2.5% to about 6.5% by weight of silicon oxide, and from about 4.0% to about 8.0% cupric oxide.

2. The device defined in claim 1 wherein said nonlinear resistance element is a disc having two metallized faces and having said coating about its perimeter.

* * * * *